(12) United States Patent
Beeson et al.

(10) Patent No.: US 7,870,915 B2
(45) Date of Patent: Jan. 18, 2011

(54) AUXILIARY SERVICE PACK FOR A WORK VEHICLE

(75) Inventors: Richard Beeson, Appleton, WI (US); John C. Leisner, Appleton, WI (US); Benjamin G. Peotter, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 465 days.

(21) Appl. No.: 11/943,564

(22) Filed: Nov. 20, 2007

(65) Prior Publication Data

US 2008/0122195 A1 May 29, 2008

Related U.S. Application Data (60) Provisional application No. 60/861,317, filed on Nov. 28, 2006.

(51) Int. Cl.
*B60K 17/28* (2006.01)
(52) U.S. Cl. ............. 180/53.1; 180/53.4; 180/69.6
(58) Field of Classification Search ............. 180/53.1, 180/53.7, 53.6, 53.5, 53.61, 53.8, 69.6, 53.4; 701/50; 62/236, 239
See application file for complete search history.

(56) References Cited

U.S. PATENT DOCUMENTS

| | | | | |
|---|---|---|---|---|
| 2,616,768 A | * | 11/1952 | Stemm | 182/2.8 |
| 2,728,463 A | * | 12/1955 | Beckwith | 180/69.6 |
| 3,156,313 A | | 11/1964 | Peterson | |
| 3,319,739 A | | 5/1967 | Mores | |
| 3,587,237 A | | 6/1971 | Pierrat | |
| 3,690,395 A | * | 9/1972 | Spiller et al. | 180/53.1 |
| 3,891,354 A | | 6/1975 | Bosch | |
| 4,029,439 A | | 6/1977 | Adams | |
| 4,189,021 A | * | 2/1980 | Scheuerpflug et al. | 180/69.6 |
| 4,293,284 A | | 10/1981 | Carlson et al. | |
| 4,359,137 A | | 11/1982 | Merz et al. | |
| RE31,500 E | * | 1/1984 | Brownfield | 180/69.6 |
| 5,107,954 A | * | 4/1992 | Fujimoto | 182/2.11 |
| 5,180,108 A | * | 1/1993 | Miyamoto | 180/69.6 |
| 5,421,705 A | | 6/1995 | Benckert | |
| 5,564,522 A | | 10/1996 | Markin et al. | |
| 5,768,811 A | * | 6/1998 | Cooper | 701/50 |

(Continued)

FOREIGN PATENT DOCUMENTS

AU 468888 12/1975

(Continued)

OTHER PUBLICATIONS

U.S. Appl. No. 12/040,328, filed Feb. 29, 2008, Beeson.

(Continued)

*Primary Examiner*—Hau V Phan
(74) *Attorney, Agent, or Firm*—Fletcher Yoder (57) ABSTRACT

A service pack for a work vehicle provides service systems, which may include an electrical generator, a hydraulic pump and an air compressor. The service pack is driven by an engine separate from that of the vehicle. Integration of the support systems for the vehicle engine and service engine may be provided. The service pack allows the vehicle engine to be shut down when at a service location, with the service pack engine alone providing the necessary electrical, hydraulic and compressed air services for maintenance and other service work.

25 Claims, 6 Drawing Sheets

U.S. PATENT DOCUMENTS

| | | | |
|---|---|---|---|
| 6,166,349 A | 12/2000 | Williams et al. | |
| 6,233,511 B1 * | 5/2001 | Berger et al. | 701/50 |
| 6,478,714 B2 | 11/2002 | Onnen et al. | |
| 6,568,493 B2 | 5/2003 | Parkert et al. | |
| 6,670,580 B2 | 12/2003 | Brofft et al. | |
| 7,013,646 B1 | 3/2006 | Serkh et al. | |
| 7,049,707 B2 | 5/2006 | Wurtele | |
| 7,150,159 B1 * | 12/2006 | Brummett et al. | 62/236 |
| 7,216,480 B2 | 5/2007 | Suzuki et al. | |
| 2005/0133489 A1 | 6/2005 | Gitter et al. | |
| 2006/0027547 A1 | 2/2006 | Silvestro | |
| 2008/0122195 A1 | 5/2008 | Beeson et al. | |
| 2008/0264920 A1 | 10/2008 | Leisner et al. | |
| 2008/0264921 A1 | 10/2008 | Kropp et al. | |
| 2008/0264922 A1 | 10/2008 | Fosbinder | |

FOREIGN PATENT DOCUMENTS

| | | |
|---|---|---|
| AU | 4447185 | 1/1987 |
| DE | 202005000677 | 3/2005 |
| DE | 102004017087 | 11/2005 |
| EP | 0458050 | 11/1991 |
| EP | 0580248 | 1/1994 |
| EP | 1065386 | 1/2001 |
| EP | 1522693 | 4/2005 |
| FR | 2873364 | 1/2006 |
| GB | 959381 | 6/1964 |
| GB | 1290925 | 9/1972 |
| GB | FR2232692 | 1/1975 |
| JP | 6127118 | 12/1986 |
| JP | 61271118 | 12/1986 |
| JP | 62253926 | 11/1987 |
| JP | 06227309 | 8/1994 |
| WO | WO0112967 | 2/2001 |
| WO | WO2006133428 | 12/2006 |
| WO | WO2007067178 | 6/2007 |
| WO | WO2008067252 | 6/2008 |

OTHER PUBLICATIONS

U.S. Appl. No. 12/040,568, filed Feb. 29, 2008, Beeson.
Brochure entitled "HIPPO 2032E"; Mobile Hydraulic Equipment Co, LLC; www.multipower.us; 2 pages.
U.S. Appl. No. 12/358,119, filed Jan. 22, 2009; Peters.
U.S. Appl. No. 12/358,147, filed Jan. 22, 2009; Peters.
U.S. Appl. No. 12/361,394, filed Jan. 28, 2009; Peotter et al.

* cited by examiner

AUXILIARY SERVICE PACK FOR A WORK VEHICLE

BACKGROUND

The present invention relates generally to work vehicles, and more particularly to arrangements for providing auxiliary support systems in such work vehicles. More particularly, the invention relates to a flexible arrangement for providing one or more of electrical power, such as for welding, compressed air and hydraulic service in a stand-alone or integrated service pack in a work vehicle.

A wide range work vehicles have been developed and are presently in service. Present estimates are that hundreds of thousands of such vehicles are operative in the United States alone. Depending upon their intended use, work vehicles may include highly integrated systems for performing operations such as welding, cutting, assembly, and so forth. Moreover, vehicles have been developed for providing hydraulic and compressed air service to applications, such as for driving air tools, pneumatic lifts and other compressed air-driven devices, as well as hydraulic lifts, hydraulic tools, concrete and metal working tools, and so forth. Similarly, where electrical power is generated on a vehicle, this may be made available for powering electrical tools, lights, and a wide range of auxiliary devices.

Approaches to the design and operation of such work vehicles that incorporate auxiliary resources tend to take two separate paths. First, the auxiliary devices may be add-on systems that can simply be retrofitted to the vehicle. This is often the case for welding supplies and generators that are supplied in a stand-alone portable or semi-portable unit that can be mounted on or retrofitted to a vehicle, typically a truck. Attempts have been made to design such units for driving air compressors and hydraulic pumps as well, to provide pneumatic and hydraulic service.

In a second, quite different approach, the systems can be designed as original equipment in the vehicle, and driven directly by the vehicle engine or indirectly, such as by a belt, clutch or hydraulic motor receiving fluid from a pump that is driven by the vehicle engine. This is common in many applications where the auxiliary systems are provided as original equipment, either standard with the vehicle or as an option. In some of these arrangements, generators, pumps, air compressors, and so forth may be driven from a power take-off shaft which is, itself, driven by the main vehicle engine. A clutch or other selective engagement mechanism may be provided to enable the service systems to be driven when desired, and disengaged from the engine when the vehicle is transported to a work site.

While both of these approaches are effective and have their place in the market, they are not without drawbacks. For example, the stand-alone units occupy useful volume in the vehicles, typically in the bed of a truck. Moreover, they are subject to space and power constraints owing, in part, to the desire to maintain their volume relative small, and allow them to be kept portable. Such arrangements may be of limited accessibility to the user, such as for maintenance and servicing of the various components. Fully integrated systems driven by a vehicle engine, on the other hand, require that the vehicle engine be powered during periods of use of any one of the auxiliary systems. The vehicle engine is often grossly overrated as compared to the power needs of the auxiliary systems, and such operation reduces the overall life of the engine and drive train for vehicle transport needs. In many applications, the engine is left idling for extended periods between actual use of auxiliary systems, simply to maintain the option of using the systems without troubling the operator to start and stop the engine.

There is a need, therefore, for new approaches to the provision of auxiliary service, particularly electrical power, compressed air service and hydraulic service in work vehicles. There is a particular need for systems which avoid drawbacks of portable, retrofitted power supplies and service packs, while also avoiding the need to drive a main vehicle engine any time that auxiliary service is required.

BRIEF DESCRIPTION

The invention provides a novel approach to the configuration of a work vehicle designed to respond to such needs. The invention is well-suited to any type of service vehicle, particularly service trucks that can be called out for a range of mobile needs, where one or more of electrical service (particularly 12 volt service), hydraulic service or compressed air service is required. The electrical service may be used for a range of applications, including for welding, work site lighting, power tools, air conditioning and heating, battery charging, and so forth. Similarly, hydraulic and pneumatic service may be available for powered tools, lifts, and so forth, generally capable of driving any conventional tools found at mobile work sites.

In accordance with certain aspects of the invention, a service pack is provided in a work vehicle and includes an engine in addition to the vehicle engine. The engine may be of any suitable type, such as diesel or gasoline engines. One or more service units is coupled to the engine, with several being coupled to the engine in exemplary embodiments. These may include electrical generators, air compressors, and hydraulic pumps. The engine may include its own separate and independent support systems, or some or all of these may be integrated with those of the main vehicle engine. Redundancy in the overall system configuration for the vehicle may thus be limited or avoided. The electrical, compressed air, and hydraulic service from the service pack may be routed to one or more external points, such as a control and service panel. Devices driven by these services may then be coupled to the service pack once the vehicle is positioned at a work site.

In operation, the service pack engine may be operated completely independent of operation of the main vehicle engine. The vehicles may thus be transported to work sites under the power of the main engine in a conventional manner, and the main engine shut down during service work. The service pack engine may be powered during these periods of operation, greatly reducing both the fuel use, the wear and tear on the main vehicle engine, as well as providing additional benefits of reduced noise and emissions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
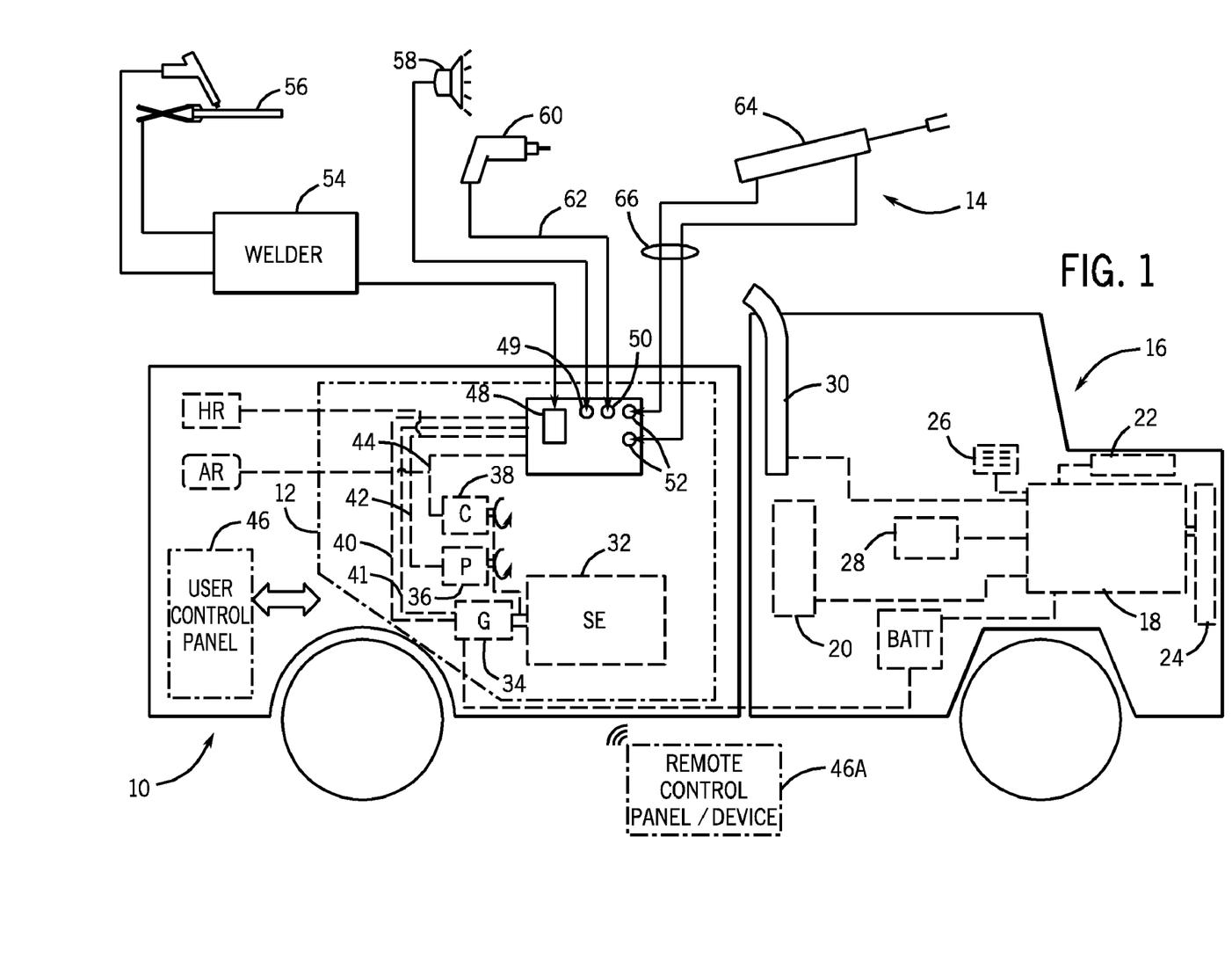
FIG. 1 is a diagrammatical overview of a work vehicle in which a service pack in accordance with aspects of the present invention is installed.

Turning now to the drawings, and referring first to FIG. 1, a work vehicle is illustrated including equipment in accordance with the invention. The work vehicle, designated generally by reference numeral 10, is shown as a work truck, although any suitable configuration for the vehicle may be envisaged. In the illustrated embodiment, the vehicle includes a service pack, designated generally by reference numeral 12 for supplying electrical, compressed air and hydraulic power to a range of applications, designated generally by reference numeral 14. The vehicle 10 has a main vehicle power plant 16 based around a vehicle engine 18. Although the invention is not limited to any particular configuration or equipment, work vehicle engines of this type will typically be diesel engines, although gasoline engines may be used in some vehicles.

The vehicle power plant 16 includes a number of conventional support systems. For example, the engine 18 will consume fuel from a fuel reservoir 20, typically one or more liquid fuel tanks. An air intake or air cleaning system 22 supplies air to engine 18, which may, in some applications, be turbo charged or super charged. A cooling system 24, which will typically include a radiator, circulation pump, a thermostat-controlled valve and a fan, provides for cooling the engine. An electrical system, designated diagrammatically at the symbol 26 will include an alternator or generator, along with one or more system batteries, cabling for these systems, cable assemblies routing power to a fuse box or other distribution system, and so forth. A lube oil system 28 will typically be included for many engine types, such as for diesel engines. As will be appreciated by those skilled in the art, such lube oil systems typically draw oil from the diesel engine crankcase, and circulate the oil through a filter and cooler, if present, to maintain the oil in good working condition. Finally, the power plant 16 will be served by an exhaust system 30 which may include catalytic converters, mufflers, and associated conduits.

The service pack 12 may include one or more service systems driven by a service engine 32. In a present embodiment, the service pack provides electrical power, hydraulic power and compressed air for the applications 14. In the diagrammatical representation of FIG. 1, for example, the service engine drives a generator 34 as well as a hydraulic pump 36 and air compressor 38. The engine itself may be of any desired type, but in a present embodiment a diesel engine is contemplated. Certain embodiments may use gasoline or other engines. The generator 34 may be directly driven by the engine, such as by close coupling the generator to the engine, or may be belt or chain driven, where desired. Presently contemplated generators include three-phase brushless types, capable of producing power for a range of applications. However, other generators may be employed, including single-phase generators and generators capable of producing multiple power outputs. The hydraulic pump 36 may be based on any conventional technology, such as piston pumps, gear pumps, vane pumps, with or without closed-loop control of pressure and/or flow. The air compressor 38 may also be of any suitable type, although a rotary screw air compressor is presently contemplated due to its superior output to-size ratio. Other suitable compressors might include reciprocating compressors typically based upon one or more reciprocating pistons.

The systems of the service pack 12 will include appropriate conduits, wiring, tubing and so forth for conveying the service generated by these components to an access point. Convenient access points will be located around the periphery of the vehicle. In a presently contemplated embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply), whereas the hydraulic pump 36 is coupled to hydraulic circuit 42, air compressor 38 is coupled to an air circuit 44. As will be appreciated by those skilled in the art, the wiring and circuitry for all three systems will typically include protective circuits for the electrical power, including fuses, circuit breakers, and so forth, as well as valving for the hydraulic and air service. For the supply of electrical power, certain types of power may be conditioned (e.g., smoothed, filtered, etc.), and 12 volt power output may be provided by rectification, filtering and regulating of AC output. Valving for hydraulic power output may include by way example, pressure relief valves, check valves, shut-off valves, as well as directional control valving. Moreover, it should be understood that, although not represented specifically in FIG. 1, the hydraulic pump will draw fluid from and return fluid to a fluid reservoir, which will typically include an appropriate vent for the exchange of air during use with the interior volume of the reservoir, as well as a strainer or filter for the hydraulic fluid. Similarly, the air compressor 38 will typically draw air from the environment through an air filter (not shown).

It should also be noted that as represented generally in FIG. 1, the generator 34 is also coupled to the vehicle electrical system, and particularly to the vehicle battery. Thus, as described below, not only may the service pack allow for 12 volt loads to be powered without operation of the main vehicle engine, but the vehicle battery may serve as a shared battery, and is maintained in a good state of charge by the service pack generator output.

The cabling and conduits 40, 41, 42 and 44 may, as in the illustrated embodiment, route service for all of these systems directly from connections on the service pack. In a presently contemplated embodiment, for example, connections are provided at or near a base of an enclosure of the service pack, such that connections can be easily made without the need to open the enclosure. Moreover, certain control functions may be available from a control and service panel 46. The service panel, as noted above, may be located on any surface of the vehicle, or on multiple locations in the vehicle, and may be covered by doors or other protective structures, where desired. There is no requirement, generally, that the service panel 46 be located at the same location, or even near the locations of access to the electrical, hydraulic or compressed air output points of the service pack. In a presently contemplated embodiment, the panel is provided in a rear compartment covered by an access door. The control and service panel 46 may permit, for example, starting and stopping of the service engine 32 by a keyed ignition or starter button. Other controls for the engine may also be provided on the control and service panel 46. The control and service panel 46 may also provide operator interfaces for monitoring the service engine 32, such as fuel level gages, pressure gages, as well as various lights and indicators for parameters such as pressure, speed, and so forth. The service panel may also include a stop, disconnect or disable switch (not separately shown) that allows the operator to prevent starting of the service pack engine, such as during transport.

As also illustrated in FIG. 1, a remote control panel or device 46A may also be provided that may communicate with the control panel 46 or directly with the service pack via cabling or wirelessly. In a manner similar to conventional crane or manlift controls, then, the operator may start and stop the service pack engine, and control certain functions of the service pack (e.g., engagement or disengagement of a clutched component, such as an air compressor) without directly accessing either the components within the service pack enclosure or the control panel 46.

As noted above, any desired location may be selected as a convenient access point for one or more of the systems of the service pack. In the illustrated embodiment, for example, one or more alternating current electrical outputs, which may take the form of electrical receptacles 48 (for AC power) and 49 (for 12 volt DC power) are provided. Similarly, one or more pneumatic connections, typically in the form of a quick disconnect fitting may be provided as indicated at reference numeral 50. Similarly, hydraulic power and return connections 52 may be provided, which may also take the form of quick disconnect fittings.

In the embodiment illustrated in FIG. 1, the applications 14 may be coupled to the service pack 12 by interfacing with the outputs provided by receptacle 48. For example, a portable welder 54 may be coupled to the AC electrical output 48, and may provide constant current or constant voltage-regulated power suitable for a welding application. As will be appreciated by those skilled in the art, the welder 54 itself may receive power from the electrical output of the generator, and itself contain circuitry designed to provide for appropriate regulation of the output power provided to cables suitable for a welding application 56. The presently contemplated embodiments include welders, plasma cutters, and so forth, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack and powered by the service pack, where desired.

Similarly, DC loads may be coupled to the DC receptacle 49. Such loads may include lights 58, or any other loads that would otherwise be powered by operation of the main vehicle engine. It should also be noted that, as mentioned above, the 12 volt DC output of the service pack also serves to maintain the vehicle battery charge, and to power any ancillary loads that the operator may need during work (e.g., cab lights, hydraulic system controls, etc.).

The pneumatic and hydraulic applications may be similarly be coupled to the service pack as illustrated diagrammatically in FIG. 1. For example, a hose 62 or other conduit may be routed from the compressed air source at the outlet 50 to a tool, such as an impact wrench 60. Many such pneumatic loads may be envisaged. Similarly, a hydraulic load, illustrated in the form of a reciprocating hydraulic cylinder 64 may be coupled to the hydraulic service 52 by means of appropriate hoses or conduits 66. As noted above, and as will be appreciated by those skilled in the art, certain of these applications, particularly the hydraulic applications, may call for the use of additional valving, particularly for directional control and load holding. Such valving may be incorporated into the work vehicle or may be provided separately either in the application itself or intermediately between the service pack and the hydraulic actuators. It should also be noted that certain of the applications illustrated diagrammatically in FIG. 1 may be incorporated into the work vehicle itself. For example, the work vehicle may be designed to include a man lift, scissor lift, hydraulic tail gate, or any other driven systems which can be coupled to the service pack and driven separately from the main vehicle engine.

The service pack 12 may be physically positioned at any suitable location in the vehicle. In a presently contemplated embodiment, for example, the service engine 32 may be mounted on, beneath or beside the vehicle bed or work platform rear of the vehicle cab. In many such vehicles, for example, the vehicle chassis may provide convenient mechanical support for the engine and certain of the other components of the service pack. For example, steel tubing, rails or other support structures extending between front and rear axles of the vehicle may serve as a support for the service engine 32. It should be noted that, depending upon the system components selected and the placement of the service pack, reservoirs may be provided for storing hydraulic fluid and pressurized air (denoted HR and AR, respectively in FIG. 1). As will be appreciated by those skilled in the art, however, the hydraulic reservoir may be placed at various locations or even integrated into the service pack enclosure. Likewise, depending upon the air compressor selected, no reservoir may be required for compressed air.

In use, the service pack will provide power for the on-site applications completely separately from the vehicle engine. That is, the service engine 32 generally may not be powered during transit of the vehicle from one service location to another, or from a service garage or facility to a service site. Once located at the service site, the vehicle may be parked at a convenient location, and the main engine 18 may be shut down. The service engine 32 may then be powered, to provide service from one or more of the service systems described above. Where desired, clutches, or other mechanical engagement devices may be provided for engagement and disengagement of one or more of the generator, the hydraulic pump and the air compressor, depending upon these service are required. Moreover, as in conventional vehicles, where stabilization of the vehicle or any of the systems is require, the vehicle may include outriggers, stabilizers (not shown), and so forth which may be deployed after parking the vehicle and prior to operation of the service pack. The invention thus allows for a service to be provided in several different manners and by several different systems without the need to operate the main vehicle engine at a service site.

Figure 2:
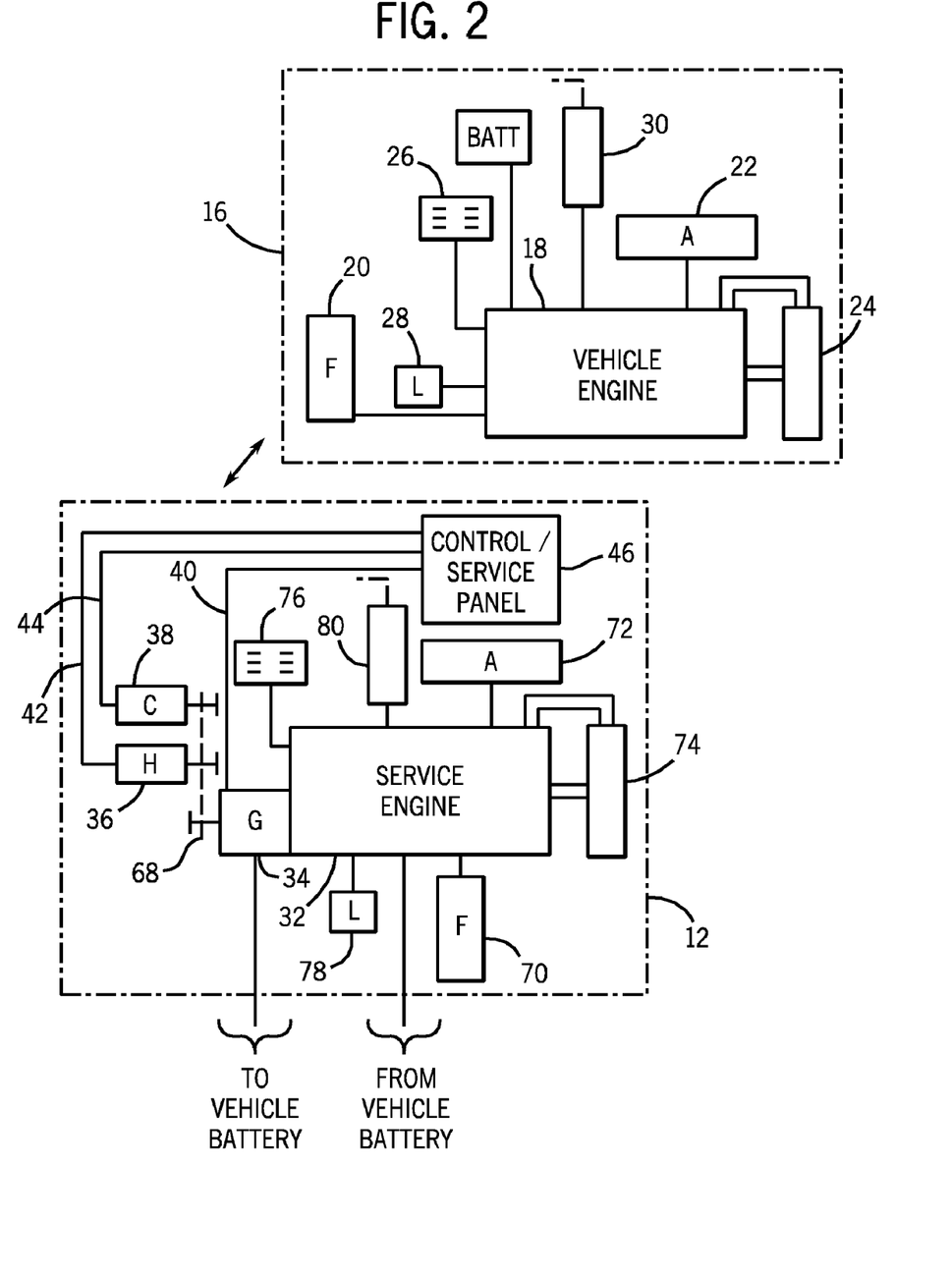
FIG. 2 is diagrammatical representation of power systems in the vehicle of FIG. 1 in accordance with one alternative embodiment, in which the service pack is completely separate and independent from support systems of the vehicle engine.

Several different scenarios may be envisaged for driving the components of the service pack, and for integrating or separating the support systems of the service pack from those of the vehicle power plant. One such approach is illustrated in FIG. 2, in which the service pack 12 is entirely independent and operates completely separately from the vehicle power plant. In the embodiment illustrated in FIG. 2, as shown diagrammatically, the support systems for the vehicle power plant 16 are coupled to the vehicle engine in the manner set forth above. The service pack 12 reproduces some or all of these support systems for operation of the service engine. In the illustrated embodiment, for example, these support systems include a separate fuel reservoir 70, a separate air cleaner system 72, a separate cooling system 74, a separate electrical protection and distribution system 76, a separate lube oil system 78, where required for the engine, and a separate exhaust system 80.

Many or all of these support systems may be provided local to the service engine 32, that is, at the location where the service engine is supported on the vehicle. As will be appreciated by those skilled in the art, on larger work vehicles, access to the location of the service engine and the service pack in general, may be facilitated by the relatively elevated clearance of the vehicle over the ground. Accordingly, components such as the fuel reservoir, air cleaner, cooling system radiator, electrical fuse box, and so forth may be conveniently positioned so that these components can be readily serviced. Also, in the illustrated embodiment, the hydraulic pump 36 and air compressor 38 are illustrated as being driven by a shaft extending from the generator 34, such as by one or belts or chains 68. As noted above, one or both of these components, or the generator itself may be provided with a clutch or other mechanical disconnect to allow them to idle while other systems of the service pack are operative.

Figure 3:
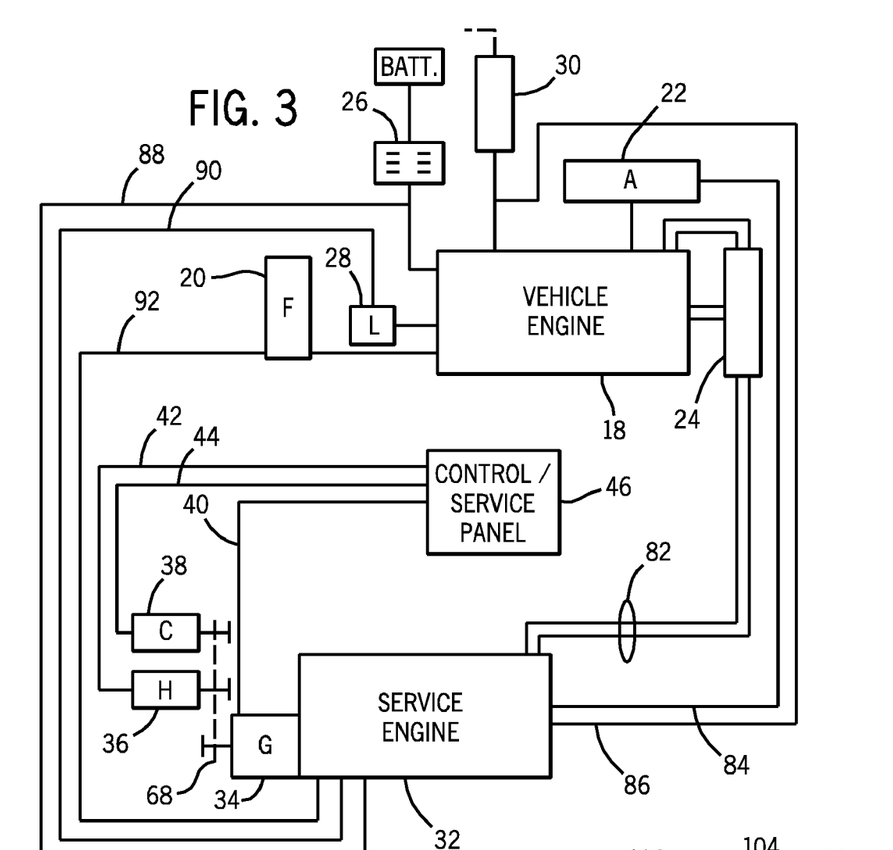
FIG. 3 is a diagrammatical representation of another alternative configuration in which support systems for the service pack are highly integrated with those of the vehicle power plant.

FIG. 3 represents an alternative configuration in which the service pack support systems are highly integrated with those of the main vehicle power plant. In the illustration of FIG. 3, for example, all of the systems described above may be at least partially integrated with those of the vehicle power plant. Thus, coolant lines 82 are routed to and from the vehicle cooling system 24, while an air supply conduit 84 is routed from the air intake or cleaner 22 of the vehicle engine. Similarly, an exhaust conduit 86 routes exhaust from the service engine 32 to the exhaust system 30 of the vehicle engine. The embodiment of FIG. 3 also illustrates integration of the electrical systems of the vehicle and the service pack, as indicated generally by the electrical cabling 88 which routes electrical power to the distribution system 26 of the vehicle. The systems may also integrate lube oil functions, such that lubricating oil may be extracted from both crank cases in common, to be cleaned and cooled, as indicated by conduit 90. Finally, a fuel conduit 92 may draw fuel from the main reservoir 20 of the vehicle, or from multiple reservoirs where such multiple reservoirs are present on the vehicle.

In presently contemplated embodiments, integrated systems of particular interest include electrical and fuel systems. For example, while the generator of the service pack may provide 110 volt AC power for certain applications, its ability to provide 12 volt DC output is particularly attractive to supplement the charge on the vehicle batteries, for charging other batteries, and so forth. It will be appreciated that the provision of both power types, however, makes the system even more versatile, enabling 110 volt AC loads to be powered (e.g., for tools, welders, etc.) as well as 12 volt DC loads (e.g., external battery chargers, portable or cab-mounted heaters or air conditioners, etc.).

It should be borne in mind that integration solutions between those of FIG. 2 and FIG. 3 are also contemplated. For example, some of the support systems may be best separated in the vehicle both for functional and mechanical or flow reasons. The present invention thus contemplates various solutions between those shown in FIG. 2 and FIG. 3, as well as some degree of elimination of redundancy between these systems. In a presently contemplated embodiment, at least some of the support systems for the primary vehicle engine are used to support the service pack power plant. For example, at least the fuel supply and electrical systems can be at least partially integrated to reduce the redundancy of these systems. The electrical system may thus serve certain support when the vehicle engine is turned off, removing dependency from the electrical system, or charging the vehicle batteries. Similarly, heating, ventilating and air conditioning systems may be supported by the service pack engine, such as to provide heating of the vehicle cab when the primary engine is turned off. Thus, more or less integration and removal of redundancy is possible.

Figure 4A:
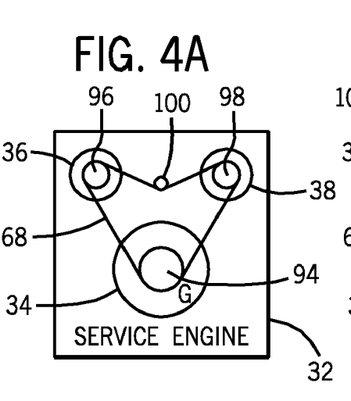
FIGS. 4A-4C are diagrammatical elevations of certain presently contemplated physical arrangements of components of a service pack in accordance with the invention in which a generator, a hydraulic pump and an air compressor are driven by a service pack engine.
Figures 4B, 4C:
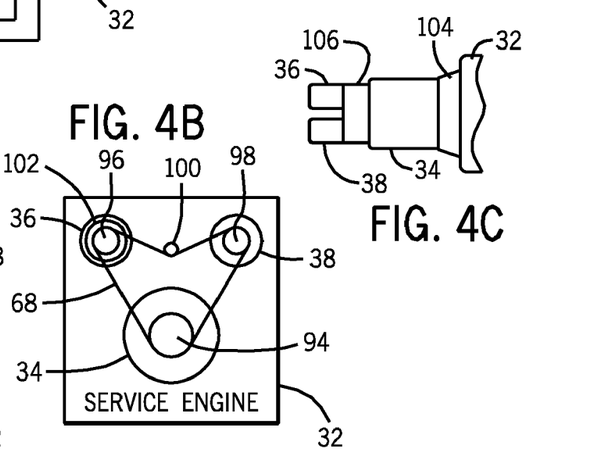

The foregoing service pack systems may also be integrated in any suitable manner for driving the service components, particularly the generator, hydraulic pump and air compressor, and particularly for powering the on-board electrical system. FIGS. 4A-4C illustrate simplified diagrams of certain manners for driving these components from the service engine 32. In the embodiment illustrated in FIG. 4A, the generator 34 may be close-coupled to the output of the engine, such as directly to the engine fly wheel or to a shaft extending from the engine. This coupling may be disposed in a support housing used to support the generator on the engine block or other engine support structures. A sheave 94 is mounted to an output shaft extending from the generator (not shown in FIG. 4), and similar sheaves 96 and 98 are coupled to the hydraulic pump 36 and air compressor 38. One or more belts 38 and/or clutches is drivingly coupled between these components, and an idler 100 may be provided for maintaining tension on the belt. Such an arrangement is shown in FIG. 4B, in which the hydraulic pump is driven through a clutch 102, such as an electric clutch. Although not shown specifically, any one of the components may be similarly clutched to allow for separate control of the components. Such control may be useful for controlling the power draw on the engine, particularly when no load is drawn from the particular component, and when the component is not needed for support of the main vehicle engine systems (e.g., maintaining a charge on the vehicle batteries).

As will be appreciated by those skilled in the art, these components may be supported in any suitable manner, and may typically include some sort of rotating or adjustable mount such that the components may be swung into and out of tight engagement with the belt to maintain the proper torque-carrying tension on the belt and avoid slippage. More than one belt may be provided on appropriate multi-belt sheaves, where the torque required for turning the components is greater than that available from a single belt. Other arrangements, such as chain drives, may also be envisaged. Moreover, as described above, the generator 34 may also be belt or chain driven, or more than one component may be driven directly by the engine, such as in an in-line configuration. In a further alternative arrangement, one or more of the components may be gear driven, with gearing providing any required increase or decrease in rotational speed from the output speed of the engine. An exemplary arrangement of this type is shown diagrammatically in FIG. 4C. In the illustrated arrangement, a support adapter 104 mounts the generator 34 on the service engine 32, and the hydraulic pump 36 and air compressor 38 are driven by a gear reducer. In such arrangements, one or more clutches may still be provided upstream or downstream of the gear reducer for selective control of the components.

It should also be noted that the particular component or components that are directly and/or indirectly driven by the engine may be selected based upon the component and engine specifications. For example, it may be desirable to directly drive the hydraulic pump, and to drive the generator via a belt or gear arrangement, permitting the engine to operate at a higher speed (e.g., 3000 RPM) while allowing a reduced speed to drive the generator (e.g., 1800 RPM for near 60 Hz AC output of a 4 pole generator).

Figure 5:
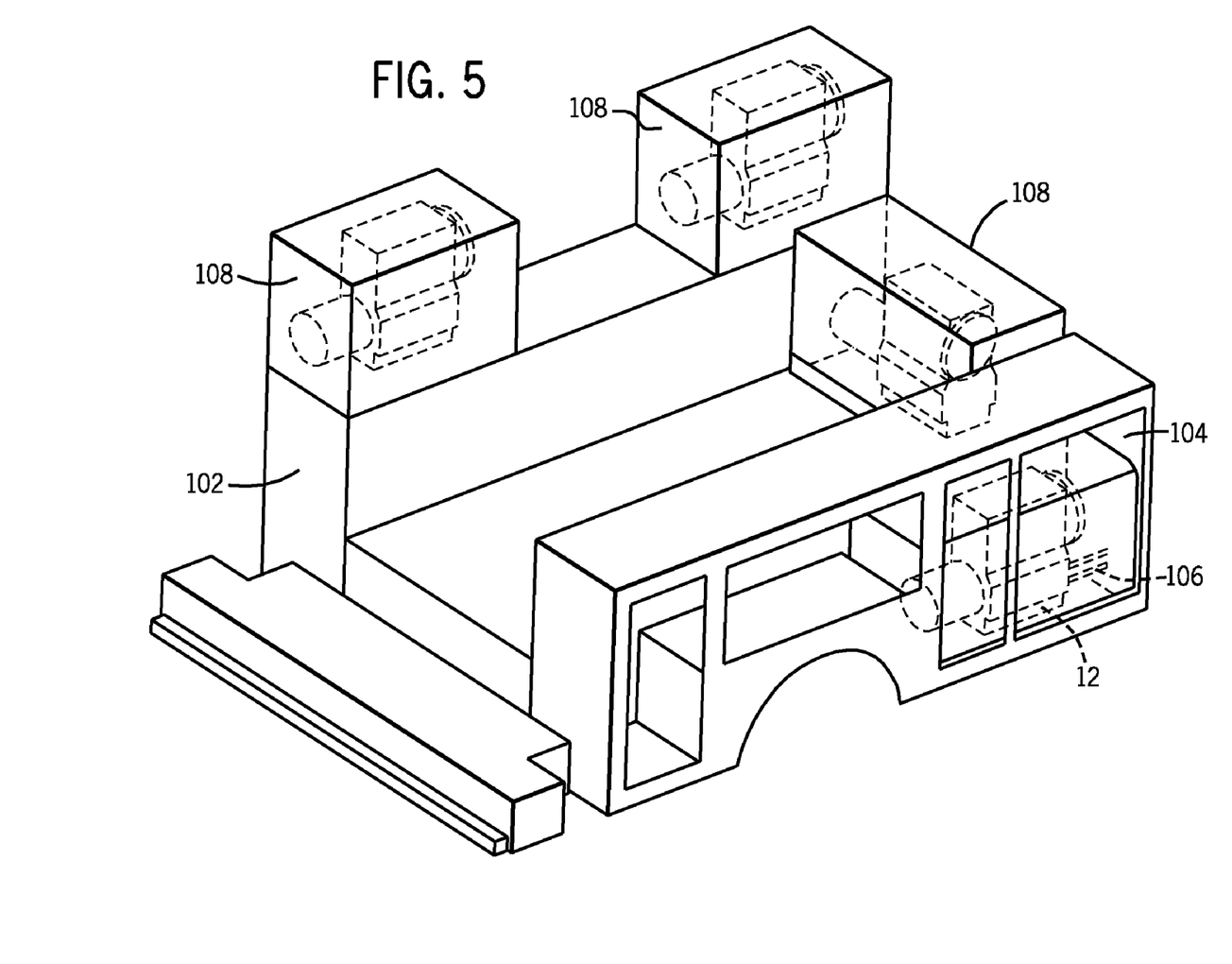
FIG. 5 is a respective view of an exemplary work vehicle bed and tool assembly illustrating exemplary placement of a service pack in accordance with embodiments of the invention.
Figure 6:
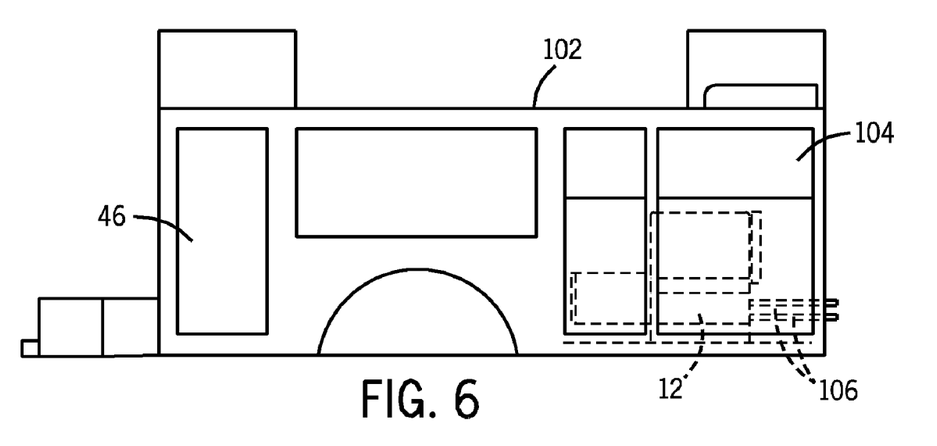
FIG. 6 is a side elevational view of an exemplary placement of the service pack as shown in FIG. 5.
Figure 7:
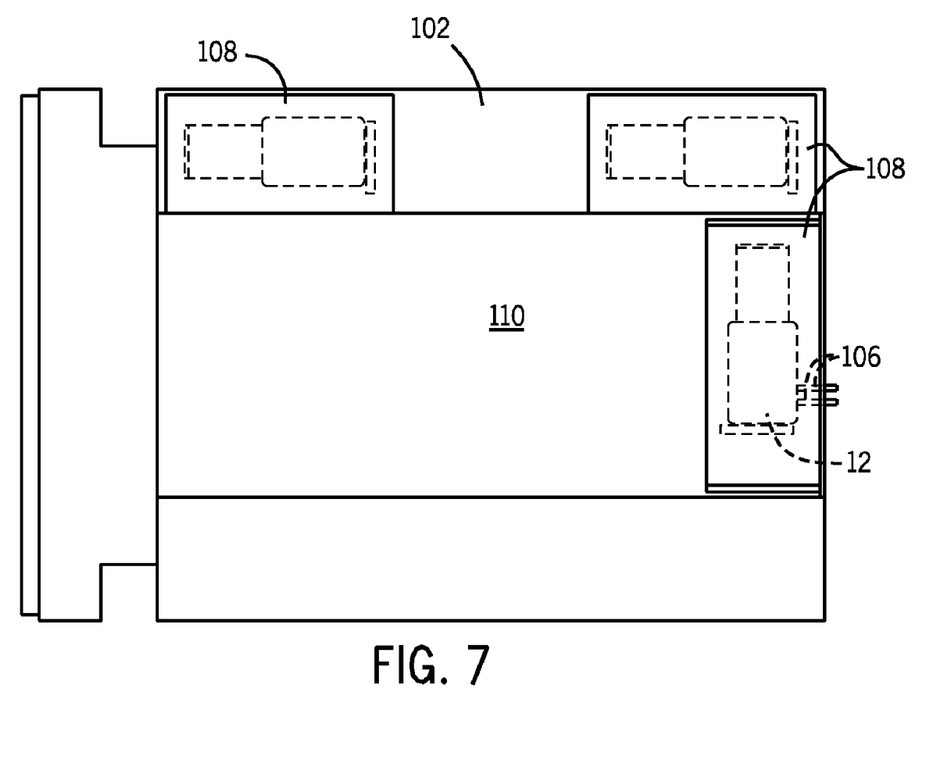
FIG. 7 is a top plan view of a work vehicle bed illustrating an alternative placement for the service pack.

FIGS. 5, 6 and 7 illustrate exemplary alternative placements for the service pack components in accordance with presently contemplated embodiments. As shown in FIG. 5, for example, the service pack 12 may be located in a portion of the vehicle bed or tool structure (e.g., tool boxes), designated generally by reference numeral 102. An opening 104 may be formed, such as in a side of the structure to receive the service pack components. Lines or conduits 106 may extend from this location to tie into other support systems for the main vehicle power plant. As noted above, these may include fuel supplies, electrical systems, as well as various other components and systems that support the main vehicle engine. The placement of the service pack 12 in this location illustrated in FIG. 5 can facilitate access to the various components serviced, and provide a location of a conventional welder or welder-generator 108 in the bed of the vehicle. Alternatively, the service pack may be positioned on the side structures on either side of the bed or work platform, as illustrated in FIG. 5 immediately aft of the cab and near the very rear of the vehicle. The particular location chosen will typically depend upon the access needed for routing lines and conduits for the systems shared with the main vehicle power plant, as well as balance and load distribution considerations.

The placements illustrated in FIG. 5 is further shown in FIG. 6 as a side view. It should also be noted in the view of FIG. 6 the same or a similar placement of the service pack may be moved somewhat inboard toward chassis rails for the vehicle to add balance and to further support the service pack components. Other placements may be envisaged, including locating the service pack components beneath the vehicle bed, immediately adjacent to the vehicle cab, and so forth. Because such vehicles are typically raised from the ground a considerable extent, easy access to the components can be had from beneath the vehicle, where appropriate.

FIG. 7 illustrates a further possible configuration in which the service pack is placed within an enclosure 108. The service pack 12, then, may, as in the previous embodiments, be tied to certain support systems for the main vehicle engine via lines 106. These may extend directly through the wall of the bed, or may be directed downwardly through a floor of the bed, or through any other passage. Thus, the service pack 12 may be conveniently dimensioned to fit within an opening 110 provided in the vehicle bed, such as between tool chests or other compartments, or again on one of the tool chests or side structures.

Figure 8:
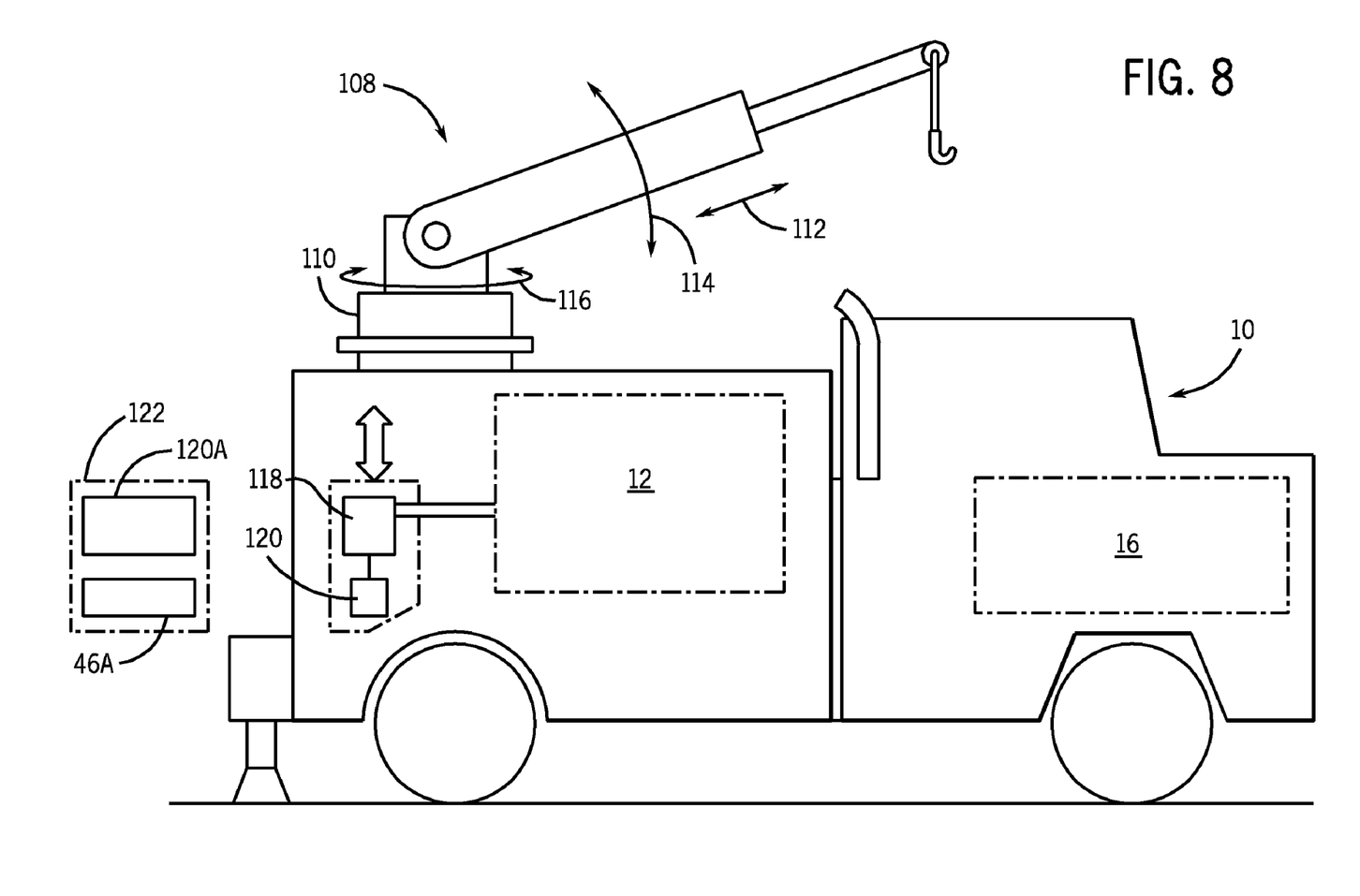
FIG. 8 is a diagrammatical representation of a service vehicle equipped with a crane that is powered by a service pack at least partially integrated with the vehicle engine support systems in accordance with aspects of the invention.

As noted above, the service pack provided by the present invention, integrated with one or more of the main vehicle engine support systems, may be designed to interface with any desired type of vehicle. Some such vehicles will include cranes, manlifts, and so forth. FIG. 8 illustrates an exemplary service pack of the invention integrated with a service vehicle on which a crane 108 is mounted. Such cranes may be mounted within a bed or on a work platform of the vehicle, or as in the illustrated embodiment, on a side support structure. Moreover, such cranes may be mechanical, electrical or hydraulically powered. The service pack of the invention enables the crane to be operated without resort to the main vehicle engine. That is, once the vehicle is positioned at the work site, the main vehicle engine may be stopped and the service pack engine started for crane operation.

In the embodiment illustrated in FIG. 8, the crane 108 is mounted on a rotating support structure 110, and hydraulically powered such that it may be extended, raised and lowered, and rotated (as indicated by arrows 112, 114 and 116, respectively) by pressurized hydraulic fluid provided by the service pack 12. The service pack 12, again, has one or more shared support systems with the main vehicle engine 16. in the illustrated embodiment, the service pack 12 is coupled to control valving (e.g., directional control valves) 118 that can be manually operated to control the crane. Controls, designated generally by reference numeral 120, may be provided with the valving in an enclosed compartment. In certain arrangements, the controls may include electrically operated valves that operate with power supplied by the service pack. In other arrangements, valving may be entirely manual.

As also illustrated in FIG. 8, where desired, a remote control pack 122 may be provided that may integrate controls for the service pack with those for the crane. In this example, a remote control interface 120A may communicate with controls 120 via a tethered connection, or wirelessly. In a manner similar to that described above with reference to FIG. 1, then, similar tethered or wireless controls may be provided for the service pack, as indicated by reference numeral 46A. Such arrangements permit the operator to control both the crane and operation of various components of the service pack, including the engine itself, via the integrated control pack.

It should be noted that certain applications may call for electrical power from the service pack and compressed air only, without a need for hydraulic service. On the contrary, other applications may call for electrical power and hydraulic service, without the need for compressed air. Applications of the latter type may include manlifts, bucket trucks and the like. In such cases, the present invention also contemplates integration of the service pack support systems with those of the main vehicle power plant, but without either the air compressor or the hydraulic pump, and the ancillary components used to support those elements, such as hoses, conduits and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A work vehicle comprising:
a service pack supported on the vehicle and including a service pack engine operable independently of operation of a main vehicle engine, the service pack further including a generator configured to provide electrical power, an air compressor, and a hydraulic pump, wherein the service pack drives the generator, the air compressor, and the hydraulic pump,
wherein a main power plant for the vehicle includes a plurality of vehicle support systems configured to support operation of the vehicle engine, and wherein at least one fluid system of the vehicle support systems is coupled to the service pack engine to support operation of the service pack engine.

2. The vehicle of claim 1, wherein the at least one fluid system comprises a fuel system, an air cleaning system, a cooling system, a lube oil system, or an exhaust system of the main power plant for the vehicle.

3. The vehicle of claim 1, wherein at least one of the generator, the air compressor, or the hydraulic pump can be selectively placed in an idle state while at least one other of them is driven by the service pack engine.

4. The vehicle of claim 1, comprising a control panel configured to enable user control of operation of the service pack engine.

5. The vehicle of claim 1, wherein electrical power, compressed air flow, and pressurized hydraulic fluid flow are routed from the service pack to at least one service access panel, and the at least one service access panel comprises an electrical outlet, a compressed air port, and a hydraulic port.

6. The vehicle of claim 1, wherein the vehicle includes a crane, and wherein output of the service pack is coupled to the crane to power operation of the crane.

7. The vehicle of claim 6, comprising an integrated control interface configured to enable user control of the crane and the service pack.

8. The vehicle of claim 1, wherein the fluid system comprises an air cleaning system, a cooling system, a fuel system, a lube oil system, and an exhaust system of the main power plant for the vehicle.

9. The vehicle of claim 1, wherein the fluid system comprises a fuel system of the main power plant for the vehicle, and the service pack engine is supported by the fuel system.

10. The vehicle of claim 1, wherein the fluid system comprises a cooling system of the main power plant for the vehicle, and the service pack engine is supported by the cooling system.

11. The vehicle of claim 1, wherein the fluid system comprises a lubrication system of the main power plant for the vehicle, and the service pack engine is supported by the lubrication system.

12. The vehicle of claim 1, wherein the fluid system comprises an exhaust system of the main power plant for the vehicle, and the service pack engine is supported by the exhaust system.

13. A work vehicle comprising:
a main power plant including a vehicle engine configured to propel the vehicle; and
a service pack supported on the vehicle and including a service pack engine operable independently of operation of the main vehicle engine, the service pack further including a generator configured to provide electrical power for electrical loads, an air compressor, and a hydraulic pump, wherein the service pack engine drives the generator, the air compressor, and the hydraulic pump,
wherein the main power plant includes a plurality of vehicle support systems configured to support operation of the vehicle engine, the service pack includes a plurality of service pack support systems configured to support operation of the service pack engine, and at least one fluid system of the vehicle support systems is coupled to the service pack engine to support operation of the service pack engine.

14. The vehicle of claim 13, wherein the at least one fluid system comprises a fuel system, an air cleaning system, a cooling system, a lube oil system, or an exhaust system of the main power plant for the vehicle.

15. The vehicle of claim 13, wherein at least one of the generator, the air compressor, or the hydraulic pump can be selectively placed in an idle state while at least one other of them is driven by the service pack engine.

16. The vehicle of claim 13, comprising a control panel configured to enable user control of operation of the service pack engine.

17. The vehicle of claim 13, wherein electrical power, compressed air flow, and pressurized hydraulic fluid flow are routed from the service pack to at least one service access panel, and the at least one service access panel comprises an electrical outlet, a compressed air port, and a hydraulic port.

18. The vehicle of claim 13, comprising a crane and an integrated control interface, wherein output of the service pack is coupled to the crane to power operation of the crane, and the integrated control interface is configured to enable user control of the crane and the service pack.

19. The vehicle of claim 13, wherein the fluid system comprises a fuel system, a liquid cooling system, and a lube oil system of the main power plant for the vehicle, and the service pack engine is supported by the fuel system, the liquid cooling system, and the lube oil system.

20. A work vehicle comprising:
a main power plant including a vehicle engine configured to propel the vehicle; and
a service pack supported on the vehicle and including a service pack engine operable independently of operation of the main vehicle engine, the service pack further including a generator configured to provide electrical power for electrical loads, an air compressor, and a hydraulic pump, wherein the service pack engine drives the generator, the air compressor, and the hydraulic pump;
wherein a fluid system and an electrical system configured to support operation of the main power plant are also configured to support operation of the service pack engine.

21. The vehicle of claim 20, wherein the fluid system comprises at least one of a fuel system, an air cleaning system, a cooling system, a lube oil system, or an exhaust system of the main power plant for the vehicle.

22. A work vehicle comprising:
a main power plant including a vehicle engine configured to propel the vehicle; and
a service pack supported on the vehicle and including a service pack engine operable independently of operation of the main vehicle engine, the service pack further including a generator configured to provide electrical power for electrical loads and a hydraulic pump, wherein the service pack engine drives the generator and the hydraulic pump;
wherein a fluid system and an electrical system configured to support operation of the main power plant are also configured to support operation of the service pack engine.

23. The vehicle of claim 22, wherein the fluid system comprises at least one of a fuel system, an air cleaning system, a cooling system, a lube oil system, or an exhaust system of the main power plant for the vehicle.

24. A work vehicle comprising:
a main power plant including a vehicle engine configured to propel the vehicle; and
a service pack supported on the vehicle and including a service pack engine operable independently of operation of the main vehicle engine, the service pack further including a generator configured to provide electrical power for electrical loads and an air compressor, wherein the service pack engine drives the generator and the air compressor;
wherein a fluid system and an electrical system configured to support operation of the main power plant are also configured to support operation of the service pack engine.

25. The vehicle of claim 24, wherein the fluid system comprises at least one of a fuel system, an air cleaning system, a cooling system, a lube oil system, or an exhaust system of the main power plant for the vehicle.

* * * * *